United States Patent
Morrison et al.

(10) Patent No.: US 6,581,661 B1
(45) Date of Patent: Jun. 24, 2003

(54) APPARATUS FOR IMPROVING TIRE TRACTION

(75) Inventors: Douglas B. Morrison, Portales, NM (US); Jeffrey A. Cooper, Clovis, NM (US)

(73) Assignee: Large Car Equipment and Apparel, LLC, Portales, NM (US)

(*) Notice: Subject to any disclaimer, the term of this patent is extended or adjusted under 35 U.S.C. 154(b) by 0 days.

(21) Appl. No.: 09/377,371

(22) Filed: Aug. 18, 1999

Related U.S. Application Data (60) Provisional application No. 60/144,941, filed on Jul. 10, 1999.

(51) Int. Cl.⁷ .......................... B60C 11/00; B60C 27/00
(52) U.S. Cl. ...................... 152/232; 152/233; 152/237
(58) Field of Search ........................... 152/217, 221, 152/232, 233, 236, 237

(56) References Cited

U.S. PATENT DOCUMENTS

| | | | |
|---|---|---|---|
| 1,113,006 A | * 10/1914 | Hauerwas, Jr. | ............. 152/233 |
| 1,489,736 A | 4/1924 | Brundage | |
| 1,586,466 A | 5/1926 | Pittenger | |
| 1,857,217 A | 5/1932 | St. Pierre | |
| 1,879,584 A | 9/1932 | St. Pierre | |
| 1,914,299 A | * 6/1933 | Sauerwald | ................. 152/237 |
| 1,995,758 A | 3/1935 | Stokke et al. | |
| 2,066,412 A | 1/1937 | Meckler | |
| 2,072,533 A | * 3/1937 | Stokke | ................... 152/237 |
| 2,107,517 A | 2/1938 | Bishop | |
| 2,223,824 A | 12/1940 | Helwig | |
| 2,224,074 A | * 12/1940 | Boyer | ..................... 152/237 |
| 2,346,298 A | 4/1944 | Gulesian | |
| 2,434,362 A | 1/1948 | Landes | |
| 2,453,426 A | 11/1948 | Freed | |
| 2,585,619 A | * 2/1952 | Becker | .................... 152/237 |
| 2,726,699 A | 12/1955 | Slotta | |
| 2,746,509 A | 5/1956 | Lang | |
| 3,545,517 A | 12/1970 | Sauer | |
| 3,696,852 A | 10/1972 | Oulman | |
| 3,854,514 A | 12/1974 | Edwards | |
| 3,955,610 A | 5/1976 | Freeman | |
| 4,074,741 A | 2/1978 | Moore et al. | |
| 4,116,254 A | 9/1978 | Seip | |
| 4,120,336 A | 10/1978 | Baskall | |
| 4,129,161 A | 12/1978 | Quintana | |
| 4,146,075 A | 3/1979 | Riedel | |
| 4,155,391 A | 5/1979 | Dieck | |
| 4,162,697 A | 7/1979 | Zinner | |
| 4,173,244 A | 11/1979 | Schultz | |
| 4,176,704 A | 12/1979 | Thorpe | |
| 4,187,894 A | 2/1980 | Peterson | |
| 4,209,049 A | 6/1980 | Regensburger | |
| 4,222,425 A | 9/1980 | Bindel | |
| 4,235,272 A | 11/1980 | Landsrath | |
| 4,266,593 A | 5/1981 | Hayashi | |
| 4,271,888 A | 6/1981 | Robinson | |
| 4,274,463 A | 6/1981 | Freeman | |
| 4,280,544 A | 7/1981 | White | |
| 4,280,545 A | 7/1981 | Martinelli | |
| 4,324,278 A | 4/1982 | Guenther | |

(List continued on next page.)

FOREIGN PATENT DOCUMENTS

| | | | | |
|---|---|---|---|---|
| AU | 278999 | * | 3/1964 | ................ 152/233 |
| GB | 6040 | * | 3/1906 | ................ 152/232 |
| GB | 319531 | * | 9/1929 | ................ 152/232 |
| GB | 2149868 A | | 6/1985 | |

*Primary Examiner*—S. Joseph Morano
*Assistant Examiner*—Jason R. Bellinger
(74) *Attorney, Agent, or Firm*—Rod D. Baker

(57) ABSTRACT

An apparatus that is used to increase traction between the tires of a vehicle and a slippery surface such as snow, ice, sand or mud. The apparatus is easily fitted transversely across the tire tread and tightened about the tire and tire rim by a take up ratchet.

4 Claims, 7 Drawing Sheets

U.S. PATENT DOCUMENTS

| | | |
|---|---|---|
| 4,334,568 A | 6/1982 | Thorpe |
| 4,334,569 A | 6/1982 | Jacob et al. |
| 4,368,769 A | 1/1983 | Rookasin |
| 4,391,315 A | 7/1983 | Jacobson |
| 4,402,357 A | 9/1983 | Granryd |
| 4,480,673 A | 11/1984 | Anderson |
| 4,513,800 A | 4/1985 | Vossenkamper |
| 4,524,591 A | 6/1985 | Lanka |
| 4,550,757 A | 11/1985 | Berchem |
| 4,574,858 A | 3/1986 | Anderson |
| 4,649,977 A | 3/1987 | Weidler |
| 4,660,611 A | 4/1987 | Gockley et al. |
| 4,690,190 A | 9/1987 | Jeindl |
| 4,719,953 A | 1/1988 | Norheim, Jr. |
| 4,749,015 A | 6/1988 | Miyagawa |
| 4,773,460 A | 9/1988 | Liao |
| 4,815,513 A | 3/1989 | Hirakawa |
| 4,832,100 A | 5/1989 | Herdeg |
| 4,836,259 A | 6/1989 | Lewin et al. |
| 4,848,430 A | 7/1989 | Lenet |
| 4,862,935 A | 9/1989 | Goto |
| 4,862,937 A | 9/1989 | Nakajima |
| 4,886,100 A | 12/1989 | Parker, III |
| 4,960,159 A | 10/1990 | Oda |
| 5,009,256 A | 4/1991 | Smith |
| 5,056,206 A | 10/1991 | Poulsen |
| 5,058,644 A | 10/1991 | Muller |
| 5,178,700 A | 1/1993 | Akitsu et al. |
| 5,236,026 A | 8/1993 | Springer |
| 5,318,087 A | 6/1994 | Chang Gun |
| 5,402,838 A | 4/1995 | Pyrozyk |
| 5,454,412 A | 10/1995 | Bowers |
| 5,454,413 A | 10/1995 | Morelli |
| 5,645,659 A | 7/1997 | Ivan |
| 5,658,106 A | 8/1997 | Dickerson, Sr. |
| 5,735,980 A | 4/1998 | Robeson |
| 5,776,271 A | 7/1998 | Sakuma et al. |
| 5,779,827 A | 7/1998 | Olexson |
| 5,785,351 A | 7/1998 | Chang et al. |
| 5,788,335 A | 8/1998 | O'Brien |
| 5,804,001 A | 9/1998 | Christian |
| 5,810,451 A | 9/1998 | O'Brien |
| 5,837,075 A | 11/1998 | Fu |
| 5,896,906 A | 4/1999 | Snyder et al. |
| 6,009,922 A | 1/2000 | Gogan |
| 6,047,754 A | 4/2000 | Drum |

\* cited by examiner

APPARATUS FOR IMPROVING TIRE TRACTION

This application claims the benefit of the filing of U.S. Provisional Patent Application Ser. No. 60/144,941, entitled "Tire Chain Apparatus," filed on Jul. 10, 1999, and the specification thereof is incorporated herein by reference.

BACKGROUND OF THE INVENTION

1. Field of the Invention (Technical Field)

The present invention relates to an apparatus temporarily attachable to vehicle tires to increase traction between the vehicle tires and the surface of a roadway or driveway. The invention is particularly useful when the driving surface is covered with ice or snow, but may also be useful in other adverse conditions, such as mud or sand.

2. Background Art

To improve traction of a vehicle on mud, snow, or ice traction devices are temporarily placed on the tread portion of the tires. Such devices utilize chains, cables, metal rods, metal plates, and even a variety of plastics have been used by the public. However, few of the devices offered to date are easy to install and remove. Most involve the use of a strap buckle, tension springs, or other means that requires the user to pull on the device in order to tighten the device about the tire. In the case of tension springs this means of application and removal is often very difficult because the user lacks the leverage to pull against the spring while crouched low to the ground. Most tension springs require considerable force to apply and remove.

Rookasin, U.S. Pat. No. 4,368,769 shows a double chain traction surface that is placed transversely across the tire tread, a steel cable that is indirectly attached to the chains, and a one-way gripping cam that locks the cable as the cable is pulled through the cam by the user. The Rookasin device does not possess a ratchet mechanism for tightening the device around the tire. The tightening function must be accomplished by the brute manual pulling, by the user, of the cable through the gripping cam.

Granryd, U.S. Pat. No. 4,402,357 is similar to the Rookasin device except that a snap buckle is used to lock the connecting strap. No levered ratchet is provided to mechanically tighten the strap, rather it must be manually pulled tight by the user. Edwards, U.S. Pat. No. 3,854,514 and Jacob et al., U.S. Pat. No. 4,334,569 are similar to Granryd, except that a more traditional strap buckle is used to secure the strap. Again, no levered ratchet is provided to assist in the actual tightening effort in either device. Bowers, U.S. Pat. No. 5,454,412 shows a tire strap that is wrapped around the tire and through the wheel, and is intended to be disposable, for one-time use only. Fundamentally, the Bowers device is a single plastic strap, much like the clamping strips used by electricians to secure a bundle of loose cables. The plastic strip is pulled through the locking cam. No levered ratchet is provided to assist in the actual tightening effort.

U.S. Pat. No. 1,489,736 to Brundage, U.S. Pat. No. 1,995,758 to Stokke et al., and U.S. Pat. No. 2,066,412 to Meckler all use a tension spring to secure the traction device about the wheel.

SUMMARY OF THE INVENTION (DISCLOSURE OF THE INVENTION)

Broadly described, the apparatus is a single length of chain that is placed transversely across the tire tread and then secured in place by a strap that is passed through the "spokes" of the wheel. The device has a ratchet mechanism that tightens the strap about the wheel as the ratchet lever is cranked back and forth. The principle components are a single chain (or other traction-providing surface, such as a spiked belt) having a length longer than the breadth of the treaded portion of the tire, a holding strap, a tightening strap, and a ratchet tightening and locking mechanism. In the preferred embodiment, the device also has a protective strap or other means to protect the two securing straps from abrasion or unwanted cuts. Each end of the chain or other traction providing means is attached to one end of each securing strap, a take up ratchet is secured to the other end of the holding strap, and the remaining end of the tightening strap is fed through and secured by the ratchet mechanism.

The apparatus is attached to the tire by placing the chain against the tread, and wrapping a strap against each sidewall, passing a longer strap around the "back" of the tire through the wheel, and then placing the longer strap into the ratchet take-up barrel. The take up ratchet is then cranked to tighten the straps and pull the chain snugly in place, and the ratchet is then locked. In the preferred embodiment, the device includes an auxiliary "protective" strap to prevent the wheel from cutting or damaging the main securing straps. The protective strap promotes the durability of the invention. Alternatively, the tightening strap remains continuously attached to the ratchet mechanism once fed through the ratchet barrel and a quick release link is used, much like a rock climber clip, to attach and release the tightening strap from the chain or traction means surface. This allows the user to quickly apply and release the device about the wheel without the need to feed the tightening strap through the ratchet mechanism before and after every use.

Thus, according to the invention there is provided an apparatus for improving traction of a tire attached to a wheel rim with openings therein, the apparatus comprising at least one traction-providing portion disposable transversely across at least a portion of the breadth of a tread of the tire, a strap take up ratchet, a holding strap disposable through the openings in the wheel rim and having a first end attached to the traction-providing portion and a second end attached to the take up ratchet, and a tightening strap having a first end attached to the traction-providing portion and a second end movably passed through the take up ratchet, the take up ratchet being engageable with the tightening strap. Controlled actuation of the take up ratchet incrementally shortens the length of the tightening strap between the traction-providing portion and the take up ratchet. Preferably, when the take up ratchet is actuated, the holding strap is contactable with the wheel rim, and the invention includes means, attached to the holding strap, for protecting the holding strap against abrasion by the rim. The traction-providing portion preferably comprises at least one chain. The invention preferably further comprises a releasable link connecting the tightening strap to the traction surface, and a releasable link connecting the holding strap to the traction-providing portion. The means for protecting comprises a protective strap, having a width greater than the width of the holding strap. The protective strap preferably comprises woven polyester and further comprising a nylon clip connecting the protective strap to the take up ratchet.

A primary object of the present invention is to provide an apparatus for increasing vehicular tire traction, the apparatus being simple and inexpensive to manufacture.

A primary advantage of the present invention is that it is easily and quickly installed and removed from a tire.

Another advantage of the invention is that the vehicle does not have to be moved to place the apparatus upon a tire.

Another advantage of the invention is that alternative traction surfaces can be applied depending upon different road conditions.

Another advantage of the invention is that it is durable and resists wear and breakage.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

(BEST MODES FOR CARRYING OUT THE INVENTION)

The present invention is a device that is placed upon a vehicle wheel to improve traction in snow or ice. The apparatus is particularly well-suited for use upon large tractor-trailer rigs having double wheel pairs on the powered axle, but may be sized and adapted for use on passenger automobiles as well. Large trucks commonly encounter, in the wintertime, icy loading docks next to retail stores, warehouses, etc. The problem is particularly acute when the truck has to back down an inclined plane, into a loading "pit", to place the trailer against the dock. After the cargo has been unloaded, the dramatically reduced weight of the truck sometimes results in inadequate traction to drive the truck back lip the ramp. In such cases, the tractor may not be movable enough to permit the installation of conventional "all-around-the-wheel" chain sets. So, a chain is needed that can be installed without moving the tractor. On the other hand, once the tractor is up the ramp or away from the dock, the need for added traction often disappears, so it is desirable to have a simple, quick-on, quick-off traction booster. The present invention meets these needs. The advantages of the invention include its simplicity (and therefore low cost), ease and speed of use, and durability.

The alternative traction nature of the apparatus takes full advantage of existing and new technology in both the driveline and braking systems of the automotive industry. These technologies provide the opportunity for specialized temporary traction apparatuses to be used with great effectiveness and for specialized needs that therefore had been addressed with full sets of chains (or similar full tire enclosure traction devices), polluting traction liquids and tow trucks. The apparatus in its simplest form can enable a tractor-trailer to extricate itself from a frozen pit loading dock. Ease of installation will enable the installer to install the apparatus in less time than it normally takes to walk around the vehicle to the power driven wheel of the vehicle. Road closures due to lost traction on inclines will be greatly reduced due to the fact of ease of installation that does not require movement of the vehicle to install the apparatus. Vehicles that lose traction at stop lights or signs, as well as in parking lots and places, will finally have a convenient, affordable and an easy way to handle the problem. This apparatus will greatly increase driving safety due to the fact hat it is so easy to use, few people will hesitate to install a traction apparatus. Fewer people will worry about getting dirty or wet, as is the case with existing traction systems.

Figure 1:
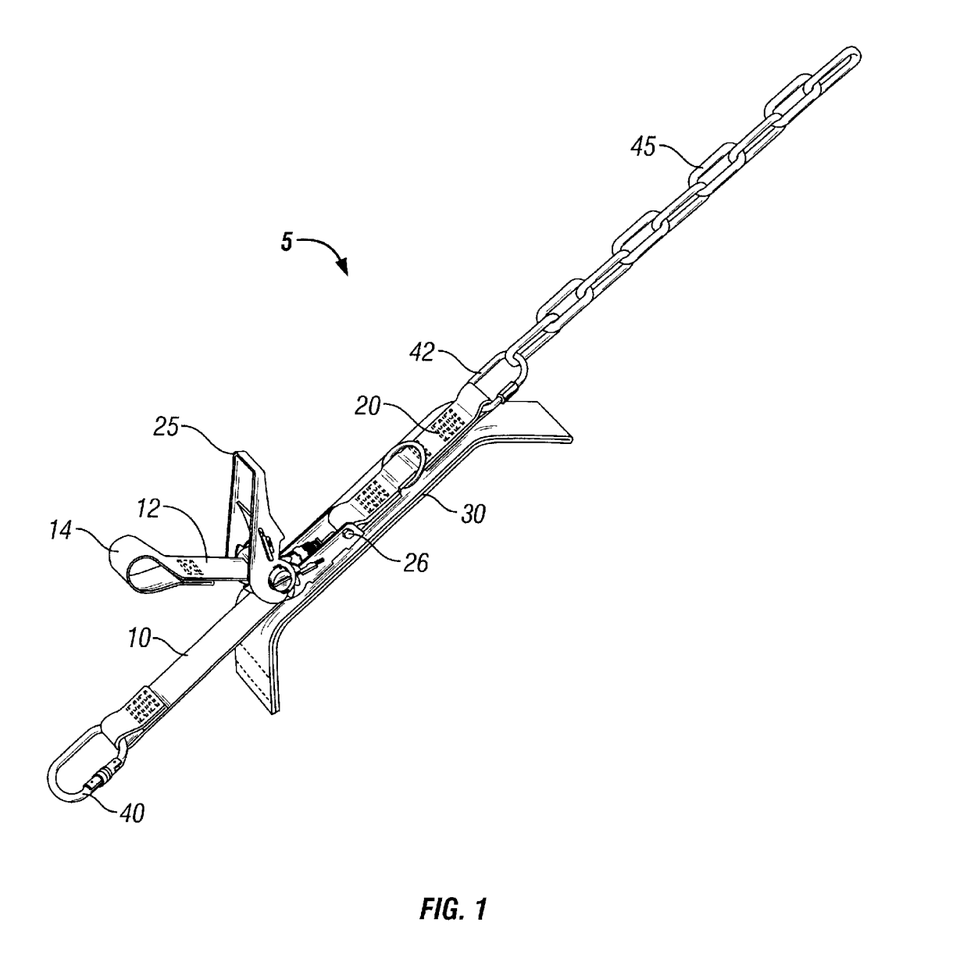
FIG. 1 is a perspective view of a preferred embodiment of the apparatus of the invention.
Figure 2:
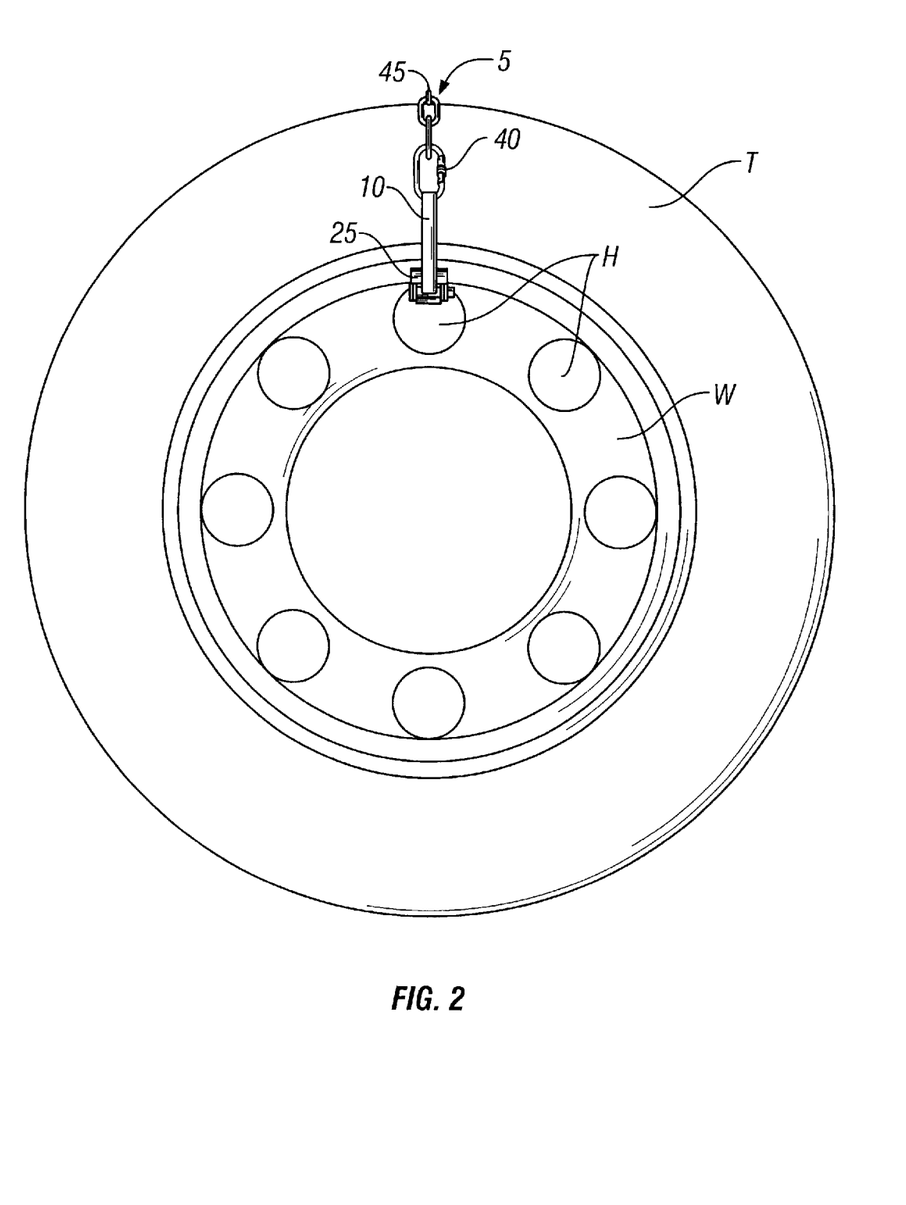
FIG. 2 is a front elevation of the apparatus of the invention, showing the apparatus installed upon the wheel and tire of a vehicle.
Figure 6:
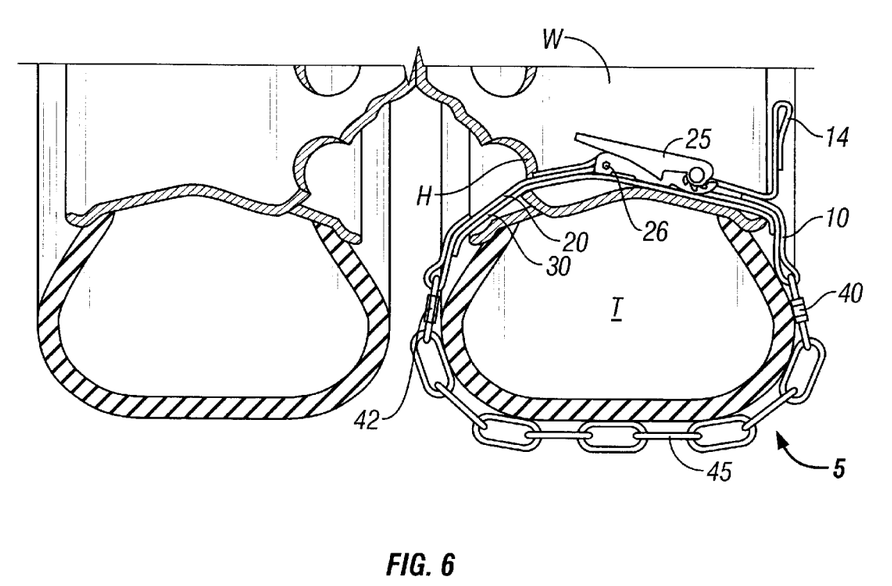
FIG. 6 is a radial or end view of the apparatus according to the invention, showing the apparatus installed on one of the tires of a dual wheel-tire commonly occurring on large tractor trucks, the tires being shown in sectional view.

The invention is not a conventional tire chain set that is placed all the way around the major circumference of the tire and then secured in place; these conventional chain sets typically require that the chain be placed on the ground and the vehicle driven forward into place over them. Instead, the inventive traction apparatus is mountable transversely upon a tire attached to a wheel rim, as seen in FIGS. 2 and 6. Thus, the present invention does not require movement of the vehicle for installation, but rather is quickly installed anywhere on the tire except at the radial portion directly in contact with the ground.

Figure 8:
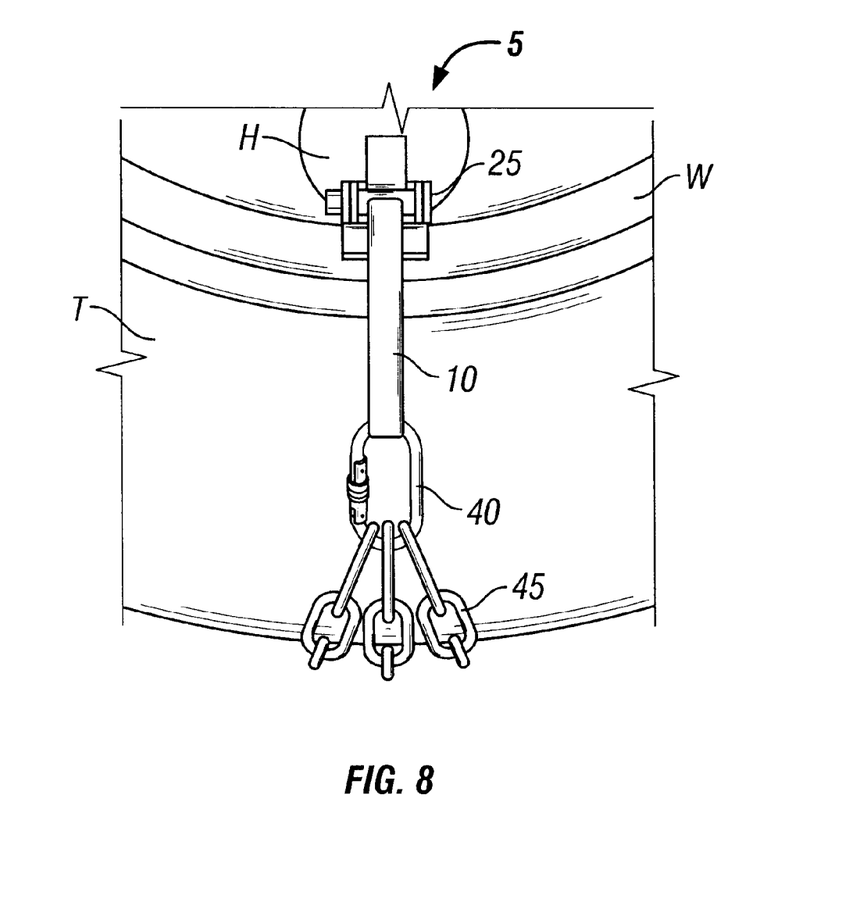
FIG. 8 is an example of applying multiple chains or an alternative traction surface to the quick release link.

The inventive apparatus is designed to add traction to a tire or tires in adverse driving conditions such as ice, snow, and mud. The apparatus is extremely easy to use, remove and store. Also, while the apparatus is inexpensive to purchase, the apparatus can withstand the incident forces present during use. More than one apparatus unit can be applied to each wheel depending on the need and the configuration of the desired traction means used. The apparatus preferably includes a chain, but any variety of traction materials may be used with the apparatus as shown in FIG. 8. The tightening mechanism is a ratchet configured by the size and the strength requirements of the intended use. The ratchet allows the apparatus to be easily tightened about the wheel without the need to forcibly pull a securing strap or feed the strap through a buckle while maintaining tension on the strap.

The inventors are also keenly aware of manufacturer flaws that occur in the production of wheel rims during casting. These flaws usually take the form of extremely sharp edges that are "out of view." In the preferred embodiment, the apparatus is equipped with a protective strap or other means to protect the securing straps from abrasion and tears.

Figure 3:
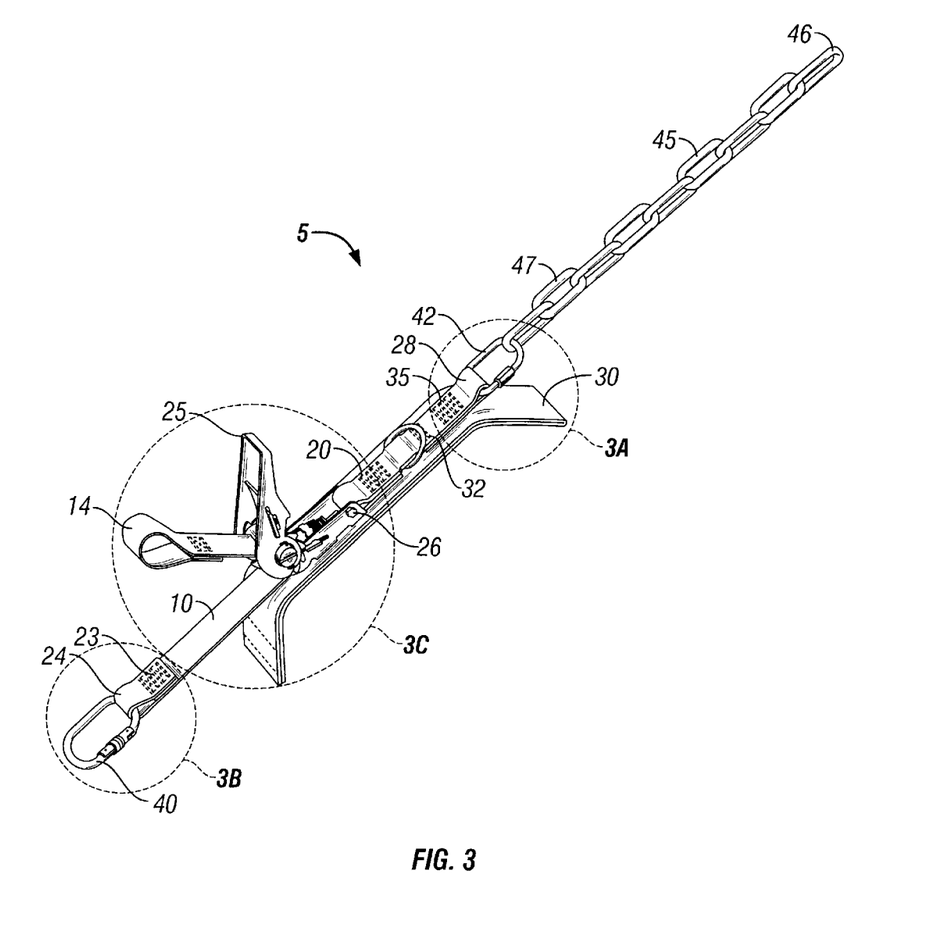
FIG. 3 is perspective view of the apparatus as shown in FIG. 1.
Figure 4:
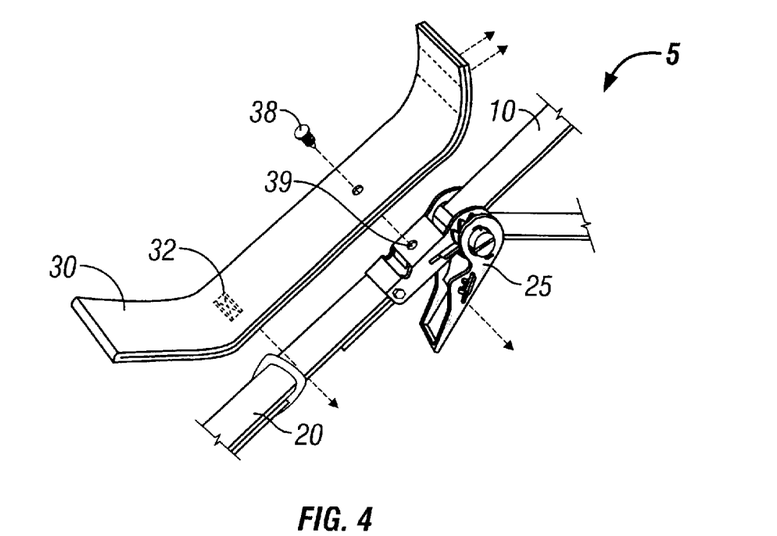
FIG. 4 is an exploded perspective view of the bottom of a portion of the apparatus shown in FIG. 1.
Figure 5:
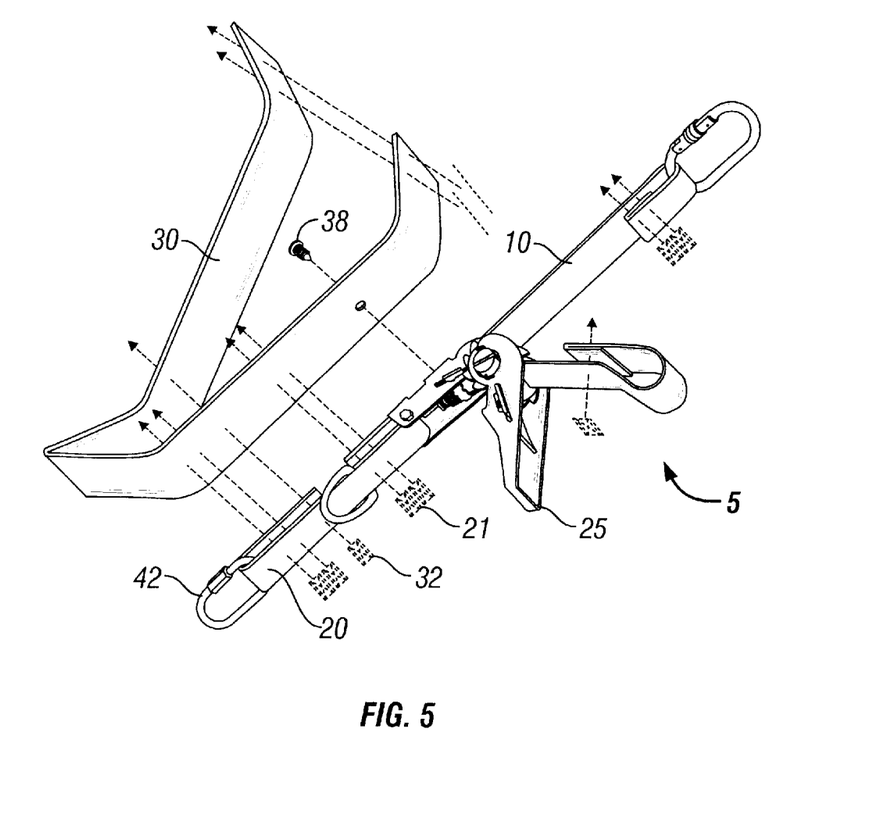
FIG. 5 is a exploded perspective view of the top of a portion of the apparatus according to the invention.

The invention is a traction apparatus preferably comprising a chain attached by a quick release linkage to a strap on either end of the chain or other traction means. As shown in FIGS. 3, 4 and 5, the apparatus 5 includes two straps, the movable tightening strap 10 and the fixed holding strap 20. The free end 12 (non-chain end) of the tightening strap is fed through the barrel of a ratchet take-up 25, and is sewn in such a way as to create a loop handle 14 for ease of handling and adjustment. The length of the tightening strap 10 is dependent on the size and type of both wheel and tire, on which the apparatus is to be used.

Figure 3A:
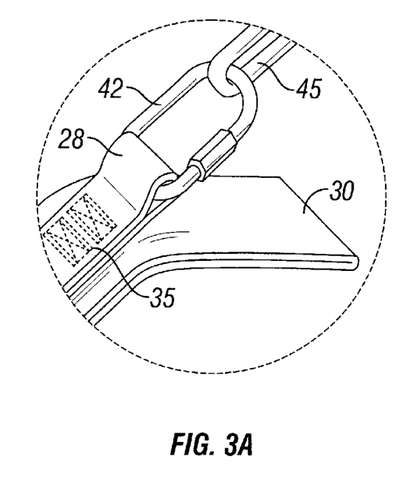
FIG. 3A is an enlarged inset view of the portion of the apparatus identified at A in FIG. 3.
Figure 3B:
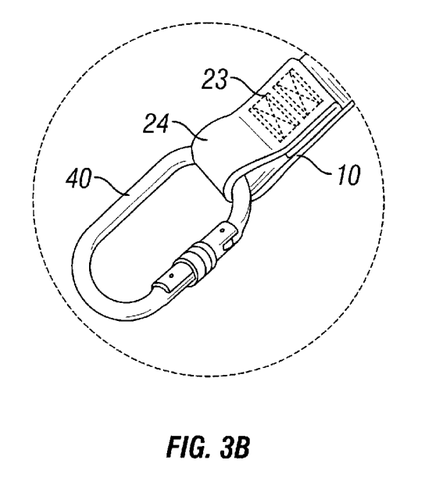
FIG. 3B is an enlarged inset view of the portion of the apparatus identified at B in FIG. 3.
Figure 3C:
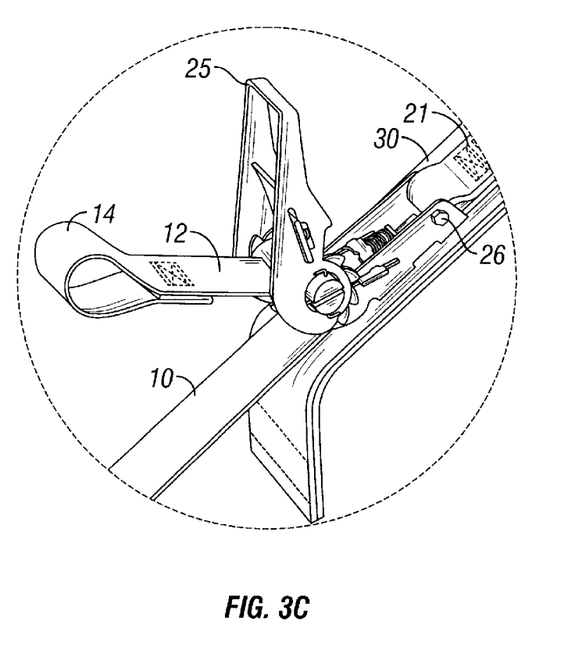
FIG. 3C is an enlarged inset view of the portion of the apparatus identified at C in FIG. 3.

The holding strap 20 is attached to the pin 26 on the ratchet 25 (FIG. 3C). As shown in FIG. 4, protective strap 30 is attached, as by sewn affirmation 32, to the bottom of the holding strap 20 directly adjacent to the sewn point 21 where the holding strap 20 is attached to the pin 26 on the ratchet 25. Adjacent to the affirmation 32 sewn on holding strap 20 is another sew point 35 (FIG. 3A). This sew point 35 is sewn to allow the link 42 to be installed and easily removed. Holding strap 20 has a specific selected length that is determined by the size and type of both wheel and tire, on which the apparatus 5 is to be used.

Preferably, the tightening strap 10 and the holding strap 20 are constructed of conventional 1-inch or 2-inch, 3,000 lb. or 5,000 lb. respectively, polyester strap webbing. All strap webbing alternatively may be composed of other durable polymers or copolymers, or of exotics such as Kevlar® fabric. The protective strap 30 is made of similar material, and has a width as least as wide as the securing straps 10 and 20. The protective strap 30 can comprise other materials such as rubber or non-rigid plastic.

The take up ratchet 25 is of known construction (FIG. 3C), and serves to permit the user to tighten by repeated lever action the tightening strap 10 by incrementally pulling the strap 10 through the barrel of the ratchet 25 and preventing it, by means of a pawl-and-ratchet assembly, from backsliding out of the barrel until deliberately released. The strap take up ratchet has teeth or other components which repeatedly frictionally engage and push the tightening strap 10 so that repeated actuation of the lever incrementally advances the strap 10 through the ratchet. Controlled actuation of the lever of the take up ratchet thus permits the user to incrementally shorten the length of the tightening strap between the chain 45 and the ratchet, thereby to tighten the apparatus upon the tire. An acceptable ratchet 25 for this purpose is available from YEU YUEH ENTERPRISES, Taichung, Taiwan, R.O.C., as item number Y-701B.

The traction-providing portion 45 of the apparatus preferably is at least one linked chain of steel or other metallic alloy. However, the traction-providing portion 45 may alternatively be a chain composed of other durable material, such as plastic. Also, the traction-providing portion need not necessarily be a linked chain, but may instead by a strip, band, or cord having a corrugated or other friction-inducing surface texture. Preferably, again, the traction-producing portion is a chain and will be so referred to in the balance of this disclosure. Furthermore, alternative embodiments employ a plurality of traction-providing members, as indicated by FIG. 8.

The chain 45 is of construction typical to chains known in tire chain devices, and can be of various sizes and types. The quantity of chains as shown in FIG. 8 may also vary depending on the size and type of quick release linkages 40 used. As shown in FIGS. 3 and 3A, the chain 45 is secured to one end of the holding strap 20 by means of releasable link 42 disposed through a loop 28 in the end of the holding strap created by doubling the strap 20 over and sewing at sewing point 35. The link 42 then is used to connect an end 47 of the chain 45 to the holding strap 20. The quick-release link 40 is fastened to one end of the tightening strap 10 by doubling it over and sewing 23 to define the loop 24 through which the quick-release link 40 is disposed, as seen in FIG. 3B.

All three straps 10, 20, and 30 are attached to the ratchet 25. The tightening strap 10 is removably attached to the ratchet 25 due to the passage of the strap 10 through the ratchet barrel and engagement with the ratchet (FIG. 3C). Of course, the tightening strap 10 may be withdrawn and disengaged completely from the ratchet 25, but in ordinary usage it is not necessary to do so as quick-release linkage 40 usually is used to install and remove the apparatus S from the tire. The holding strap 20, as mentioned, is looped and sewn for attachment to the pin 26 on the ratchet 25. The protective strap 30 is attached to the bottom of the ratchet 25 by means of a nylon clip 38 that passes through strap 30 into a base plate hole 39 in the ratchet 25 (as seen in FIGS. 4 and 5). The proximate or second end 47 of the chain 25 is semi-permanently connected to the distal end of the holding strap 20 by means of the link 42, as seen in FIG. 3A. The chain 25 only needs to be disconnected from the holding strap 20 when an alternative traction means is applied to the apparatus 5.

The protective strap 30 as shown in FIGS. 4 and 5 is preferably a 2- or 3-inch strap of a selected strength and thickness, which runs from beyond the barrel end of the ratchet's bottom plate to the distal end of the holding strap 20, where holding strap 20 attaches to the linkage 42 by means of the loop 28. The loosely extended portion of the protective strap 30 that extends past the aforementioned sew point 32 that attaches the protective strap 30 to the holding strap 20 is of particular importance as an abrasion and cut resistant measure. When the apparatus is properly installed, the protective strap 30 serves to protect the holding strap from cutting and wear as the holding strap comes in contact with the edge of the wheel rim as shown in FIG. 6.

The nylon clip 38 as shown in FIGS. 4 and 5 also serves a function beyond merely attaching the protective strap 30 to the ratchet 25. The clip 38 preferably is fashioned from high-density nylon, and is available from YEU YUEH ENTERPRISES, Taichung, Taiwan, R.O.C., as item number Y-1878L. The nylon clip 38 fosters and maintains proper placement of the apparatus 5 on the tire. The configuration and position of the nylon clip 38 prevents the apparatus 5 from improperly shifting and flopping into improper position during installation and use. The clip 38 holds the ratchet 25 on the circumferential center line of the total apparatus while in use. Due to the unique mode of linkage of the protective strap 30 to the ratchet 25, even when the chain rolls, the ratchet 25 maintains its proper position as shown in FIG. 6. Moreover, if the ratchet is improperly positioned on the wheel the clip 38 is prone to fail. Thus, failure of the clip 38 serves as a sort of mis-installation indicator.

Figure 7:
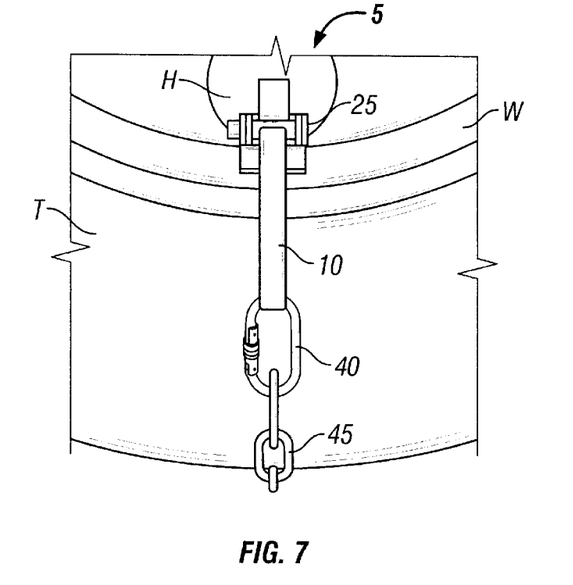
FIG. 7 is an enlarged side view of the apparatus of the invention installed upon a tire-wheel combination of a vehicle.

The use of the inventive apparatus 5 is apparent from the foregoing, but reference to FIGS. 2, 6 and 7 provide additional information. The apparatus 5 maybe conveniently stored in a toolbox or trunk or the like on a tractor trailer or automobile. The apparatus typically is stored with the tightening strap 10 fed through the barrel of the ratchet 25, but with the first end 46 of the chain 25 disengaged from the quick release linkage 40. When the user identifies the need for additional traction, the apparatus 5 is removed from the truck. The apparatus can be placed upon the tire without the need to rotate the wheel or remove it from the vehicle. As shown in FIGS. 2, 6, and 7, the apparatus 5 is wrapped radially around the wheel so as to place the straps 10, 20 and 30 along the sidewalls, and with the chain 25 placed laterally across the tread of the tire (see FIG. 6.). With the apparatus placed loosely around the wheel the holding strap 20 and protective strap 30 are fed through an opening in the wheel rim. Such openings are common in tractor-trailer wheels as well as most passenger car wheels. The protective strap 30 protects the main holding strap 20 against damage by the edge of the wheel. The user then employs the quick-release linkage 40 to connect the one end 46 of the chain 25 to the tightening strap 10. The ratchet 25 is then repeatedly actuated manually to incrementally tighten the entire apparatus about the wheel as shown in FIGS. 2, 6, and 7. The vehicle can then be driven with the apparatus attached to the wheel or wheels. When the need for added traction has passed, the apparatus 5 is easily released by the expedient disengaging of the ratchet 25 allowing the tightening strap 10 to assume a slack or loose position about the wheel. The apparatus is then removed from the wheel by disengaging the chain from the quick-release link 40.

A significant advantage of the invention is that the user need no rely on manual brute force to pull the apparatus 5 tight upon the tire. The tightening action is assisted by the ratchet 25, so that the apparatus may be installed quickly but securely. If the ratchet is tightened in an incorrect position, the clip 38, made from nylon and breakable under severe lateral stress, will fail, thereby to indicate that the apparatus should not be used. A broken clip 38 is easily replaced.

Thus, it is seen that the invention can readily be installed upon, and removed from, any radial position upon the wheel not in direct contact with the ground. It has a simple, single "loop" character whereby one adjustable linear apparatus is wrapped around a single minor circumference of the "donut" of the tire at a single radial location as shown in FIGS. 2 and 7, as opposed to "all-around-the-tire" conventional tire chain configurations.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:
1. An apparatus for improving traction of a tire attached to a wheel rim with openings therein, the apparatus comprising:
  at least one traction-providing portion disposable transversely across at least a portion of the breadth of a tread of the tire;
  a strap take up ratchet;
  a holding strap, disposable through the openings in the wheel rim, and having a first end attached to said traction-providing portion and a second end attached to said take up ratchet, wherein when said take up ratchet is actuated said holding strap is contactable with the wheel rim;
  a tightening strap having a first end attached to said traction-providing portion and a second end movably passed through said take up ratchet, said take up ratchet engageable with said tightening strap; and
  a protective strap, attached to said holding strap and having a width greater than the width of said holding strap, for protecting said holding strap against abrasion by the rim.

2. An apparatus according to claim 1, wherein said protective strap comprises a woven member comprised of a material selected from the group consisting of polyesters, polymers, and Kevlar® fabric, and further comprising a nylon clip connecting said protective strap to said take up ratchet.

3. A traction apparatus mountable transversely upon a tire attached to a wheel rim, said apparatus comprising:
  at least one traction-providing portion having a length corresponding approximately to the breadth of the tread and disposable across the tire tread;
  a lever-actuated strap take up ratchet;
  a tightening strap having a first end attached to said traction-providing portion and a second end passable through said take up ratchet;
  a holding strap having a first end attached to said traction-providing portion and a second end attached to said take up ratchet; and
  a protective strap, attached to said take up ratchet for protecting said holding strap against abrasion from said wheel rim, and comprising woven polyester and a width greater than the width of said holding strap.

4. An apparatus according to claim 3 further comprising a breakable nylon clip for attaching said protective strap to said take up ratchet.

* * * * *